United States Patent [19]

Musha et al.

[11] Patent Number: 5,419,280
[45] Date of Patent: May 30, 1995

[54] MILKING MACHINE

[75] Inventors: Toshimitsu Musha, 2-13-17, Minami-tsukushino, Machida city, Tokyo; Seiji Horiuchi, Second accommodations, 718-12, Ooaza toluma, Nagano city, Nagano prefecture; Kiyotaka Matsuki, Nagano; Naotake Nishizawa, Nagano; Hiroyuki Iwasaki, Nagano; Ryuji Maruyama, Nagano; Takashi Sasaki, Nagano, all of Japan

[73] Assignees: Milking Automation Technology Co., Ltd., Nagano; Toshimitsu Musha, Tokyo; Seiji Horiuchi, Nagano, all of Japan

[21] Appl. No.: 36,736

[22] Filed: Mar. 25, 1993

[30] Foreign Application Priority Data

Mar. 27, 1992 [JP] Japan ................. 4-012154
Mar. 27, 1992 [JP] Japan ................. 4-102155
Mar. 27, 1992 [JP] Japan ................. 4-102156
Mar. 27, 1992 [JP] Japan ................. 4-102157

[51] Int. Cl.6 .......................................... A01J 5/16
[52] U.S. Cl. ............................. 119/14.28; 119/14.38
[58] Field of Search ............... 119/14.01, 14.08, 14.18, 119/14.28, 14.38, 14.41

[56] References Cited

U.S. PATENT DOCUMENTS

3,703,645 11/1972 Swift ........................ 119/14.28 X
4,011,838 3/1977 Nordegren et al. ............ 119/14.08
4,366,772 1/1983 Panock ....................... 119/14.01

FOREIGN PATENT DOCUMENTS

378597 4/1991 Japan .
387524 4/1991 Japan .
1546023 2/1990 U.S.S.R. ...................... 119/14.18

Primary Examiner—Robert P. Swiatek

[57] ABSTRACT

A milking machine, which fastens teat cup liners R to teats B of a cow and repeats vacuum suction and quiescence for milking the cow, includes 1/f fluctuation signal generation module unit 2 for generating a 1/f fluctuation signal Ss based on the biorhythm of the cow and a control unit 3 for changing the control amount during milking, for instance, the number of pulses per unit time of a pulse control signal Sc for switching the suction and the quiescence, the duty ratio of the pulse control signal Sc, or the magnitude of the negative pressure corresponding to the 1/f fluctuation signal Ss.

9 Claims, 10 Drawing Sheets

MILKING MACHINE

FIELD OF THE INVENTION

The present invention relates to a milking machine for milking a cow and more particularly to a milking machine having teat cup liners to be fastened to teats of a cow for sucking milk using negative pressure.

DESCRIPTION OF THE RELEVANT ART

Generally, a milking machine is employed for milking a cow. When using the milking machine, teat cup liners are fastened to teats of a cow, then negative pressure (around 350 mmHg) from a vacuum pipe permits suction of the milk. In order to prevent hyperemia and congestion of the teats, suction and quiescence are repeated during the milking. In this case, the number of cycles of suction and quiescence per minute, i.e., a number of pulsations, is around 60, and the ratio between the suction period and the quiescence period, i.e., pulsation ratio, is approx. 6:4. Conventionally, these values have been set constant.

Figure 17:
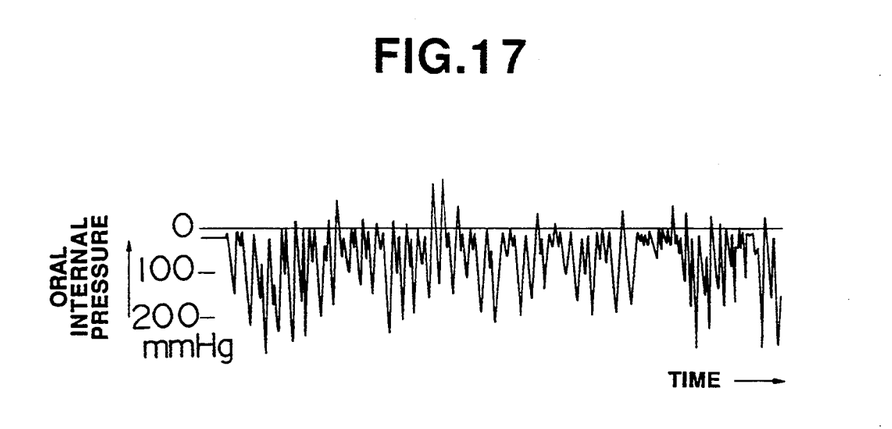
FIG. 17 is a measured figure chart showing the change in inside pressure of a mouth of a calf during sucking.
Figure 18:
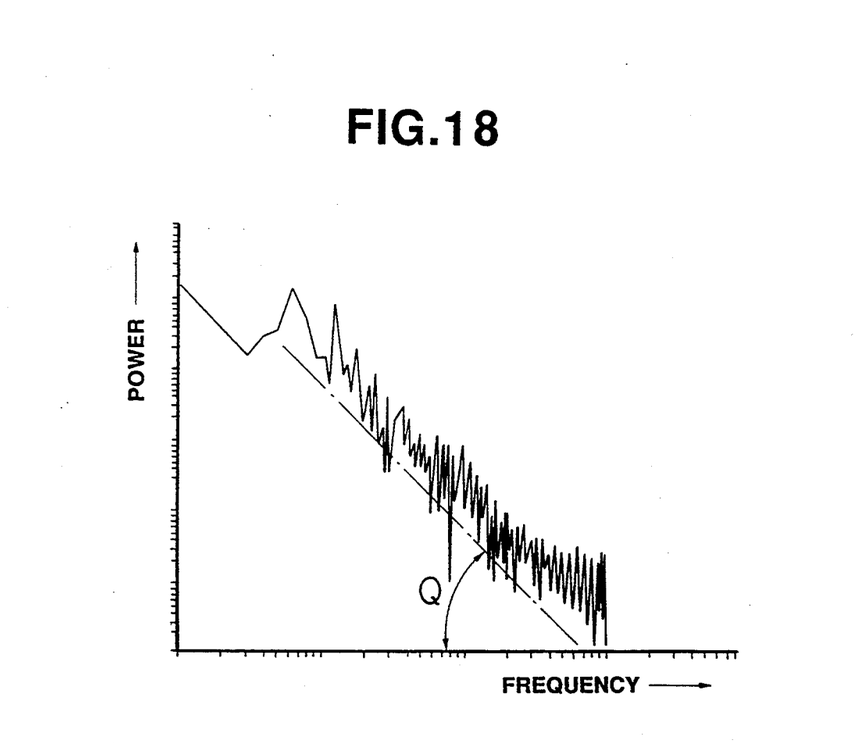
FIG. 18 is a power spectrum characteristic chart of the time change in the measured data of FIG. 17.
Figure 19:
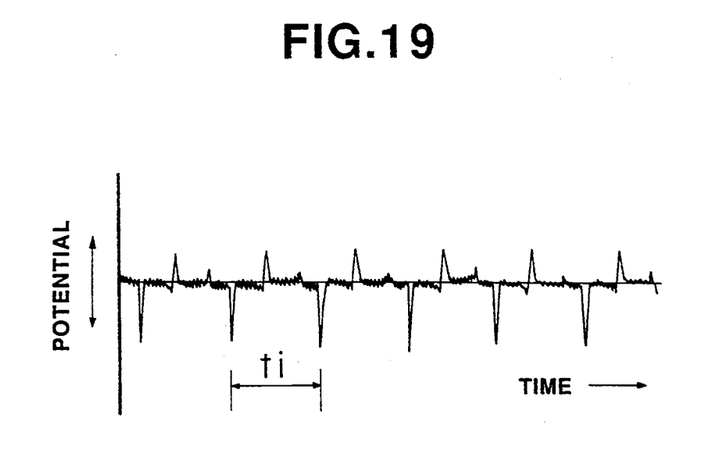
FIG. 19 is an electrocardiogram of a cow.
Figure 20:
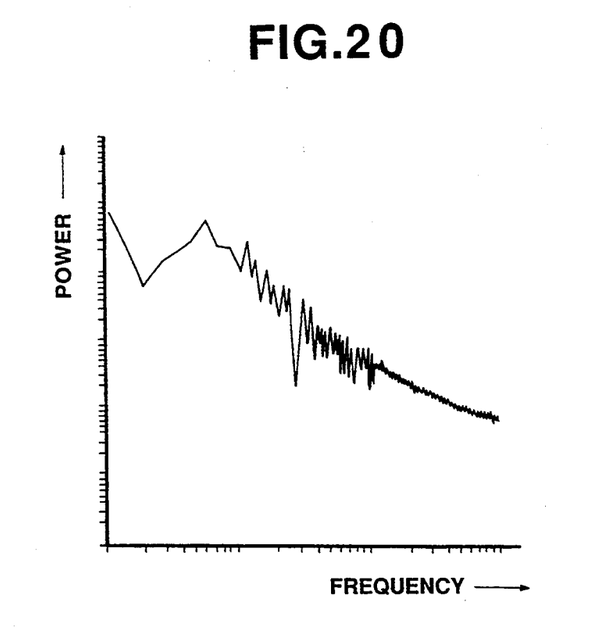
FIG. 20 is a power spectrum characteristic chart of the change in the heart beat interval obtained from FIG. 19.

Further, measured values of the inside pressure of a mouth of a calf during sucking varies as shown in FIG. 17. When the variance is converted into characteristics between frequency "f" indicating a sucking frequency of the calf and power spectrum indicating the pressure inside the calf's mouth, it shows clear 1/f fluctuation (power spectrum 1/sucking frequency as shown in FIG. 18. In addition, the electrocardiogram of the cow shows the variations as shown in FIG. 19. When the change in the heart beat interval ti is converted into characteristics between frequency f of the cow's heart beat and power spectrum indicating the magnitude of the cow's heart beat using the electrocardiogram, it shows clear 1/f fluctuation as shown in FIG. 20. 1/f fluctuation is a condition in which an angle Q of a power spectrum has an inclination of almost 45° degrees (see FIG. 18), and the condition is known to give favorable influence to a living body. 1/f fluctuation was Laid-open, for instance, in Japanese Patent Application Publication No. Hei 3-78597 (1991), the technique is used for controlling wind force of a fan, or in Japanese Patent Application Laid-open No. Hei 3-87524 (1991), where it is used in lighting control of a fireplace.

On the contrary, in conventional milking machines, pulsations per minute, a magnitude of negative pressure during suction, and a pulsation ratio are all constant, and these elements are set from a point of milking efficiency. In general, continuation of the same stimulation brings boredom, therefore, when a conventional milking machine with such continuous condition is employed, it causes the cow increased stress and unpleasant feeling, and in the result, it can be a primary factor of deterioration of the milking efficiency or diseases such as mastitis.

SUMMARY OF THE INVENTION

It is an object of the present invention to provide a milking machine which reduces stress and an unpleasant feeling of a cow during milking so that the milking efficiency can be dramatically improved.

Further, it is another object of the present invention to provide a milking machine which prevents diseases caused by milking such as mastitis.

In order to achieve the above objects, according to the present invention, a milking machines 1, 1x, and 1y for milking a cow by fastening teat cup liners R to teats B of the cow and repeating vacuum suction or quiescence, said milking machines comprise a 1/f fluctuation signal generation module unit 2 for generating a 1/f fluctuation signal Ss and a control unit 3 for changing the control amount during the milking corresponding to said 1/f fluctuation signal Ss. In this case, the 1/f fluctuation signal generation module unit 2 generates the 1/f fluctuation signal Ss from the biorhythm of a cow. The control unit 3 includes a control signal generator 4 for generating a pulse control signal Sc which changes corresponding to the 1/f fluctuation signal Ss, and a change-over switch 5 for switching suction to quiescence or vice versa corresponding to the pulse control signal Sc. The control signal generator 4 generates the pulse control signal Sc for changing the duty ratio (the pulsation ratio) within the range of 40 to 70% corresponding to the 1/f fluctuation signal Ss, or the pulse control signal Sc for changing the pulses per unit time (the number of pulsation) within the range of 40 to 70 per minute corresponding to the 1/f fluctuation signal Ss. In addition, the control unit 3 also changes the magnitude of negative pressure corresponding to the 1/f fluctuation signal Ss within the range of 300 to 400 mmHg. Further, in the present invention, the milking machine may have a 1/f fluctuation music generation unit 6 for generating 1/f fluctuation music during the milking.

With such a configuration, negative pressure is applied to the teat cup liners R fastened to the teats B, the suction action enables milking, and the control amount during the milking is set to be changed as follows. The 1/f fluctuation signal generation module unit 2 generates the 1/f fluctuation signal Ss generated from the biorhythm of the cow, and the 1/f fluctuation signal Ss changes a for instance, the duty ratio of the pulse signal transmitted from the control signal generator 4. As a result, the pulse control signal Sc modulated by the 1/f fluctuation signal Ss is generated and passed to the change-over switch 5. Therefore, the ON-period or the OFF-period of the pulse control signal Sc control the generation time or the pause time of the negative pressure, thus the suction period or the quiescence period are changed corresponding to the 1/f fluctuation signal Ss. Also, the duty ratio is optimal when it is appropriately changed within the range of approx. 40 to 70%.

In addition to changing the duty ration during milking, the pulses per unit time or the magnitude of negative pressure may also be changed. In practical applications, one, two or more of these variables can be combined. In addition, during milking, 1/f fluctuation music made from the 1/f fluctuation music generation unit 6 permits more effective milking.

In the present invention, "1/f" in "1/f fluctuation" means a concept which contains arbitrary multiplied products such as $1/f^{1.5}$, $1/f^{1.7}$, $1/f^2$, and $1/f^3$.

DETAILED DESCRIPTION OF THE PREFERRED EMBODIMENTS

Next, the preferred embodiments of the present invention will be explained in detail referring to FIGS. 1-20.

Figure 3:
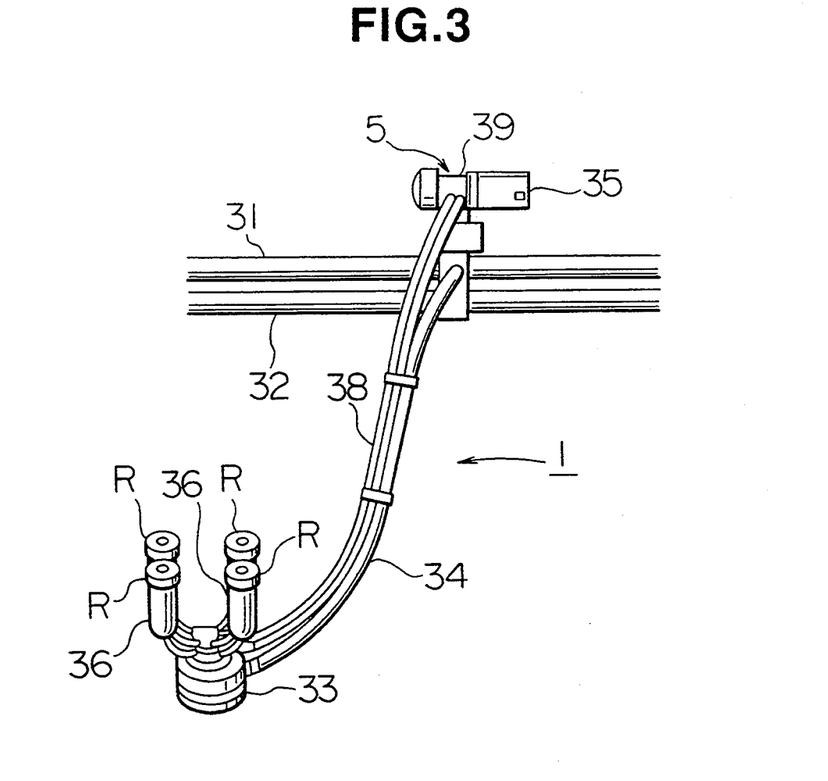
FIG. 3 is a perspective view showing a whole configuration of the milking machine of FIG. 1.
Figure 4:
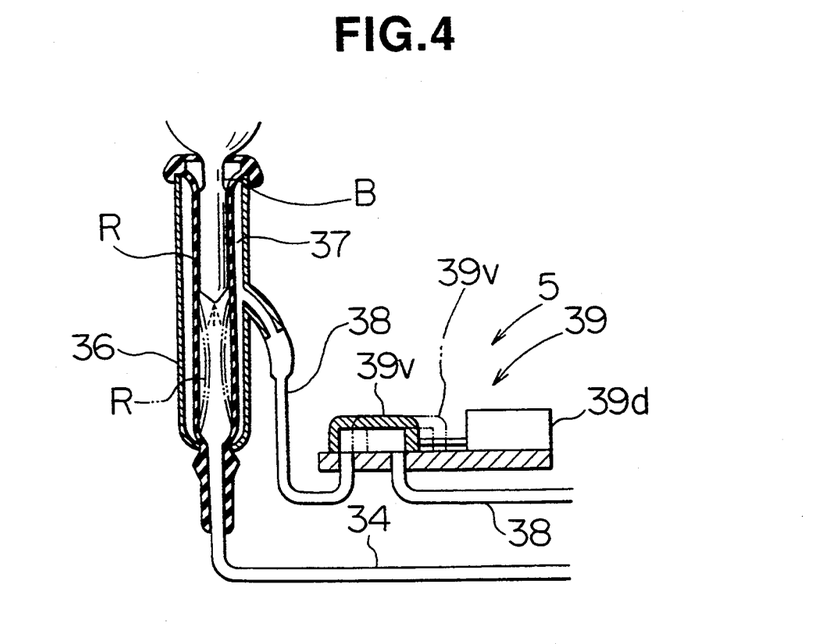
FIG. 4 is an explanative figure of a function of the milking machine of FIG. 1 including a sectional view of a teat cup liner.

First, the milking machine 1 of the preferred embodiment will be generally explained referring to FIG. 3 and FIG. 4.

In the milking machine 1 shown in FIG. 3, element 31 is a milk pipe, and 32 is a vacuum pipe. R are four teat cup liners of rubber to be fastened to teats B (see FIG. 4). Each teat cup liner R is connected to the milk pipe 31 through a milk claw 33 and a milk tube 34. The outside of the teat cup liners R are covered by teat cup shells 36. An internal cavity 37 of the teat cup shell 36 is connected to the vacuum pipe 32 through a vacuum tube 38 and an electromagnetic pulsator 39 (the change-over switch 5).

FIG. 4 shows the detail of the teat cup liner R and the electromagnetic pulsator 39. The electromagnetic pulsator 39 has a change-over valve 39v and an electromagnetic driver 39d for shifting the change-over valve 39v. When the change-over valve 39v is switched to one side, the vacuum tube 38 is in a state of "suction" in which passage is available, and when the switch-over valve 39v is switched to other side, the internal cavity 37 is in a state of "quiescence" opened to air.

Figure 1:
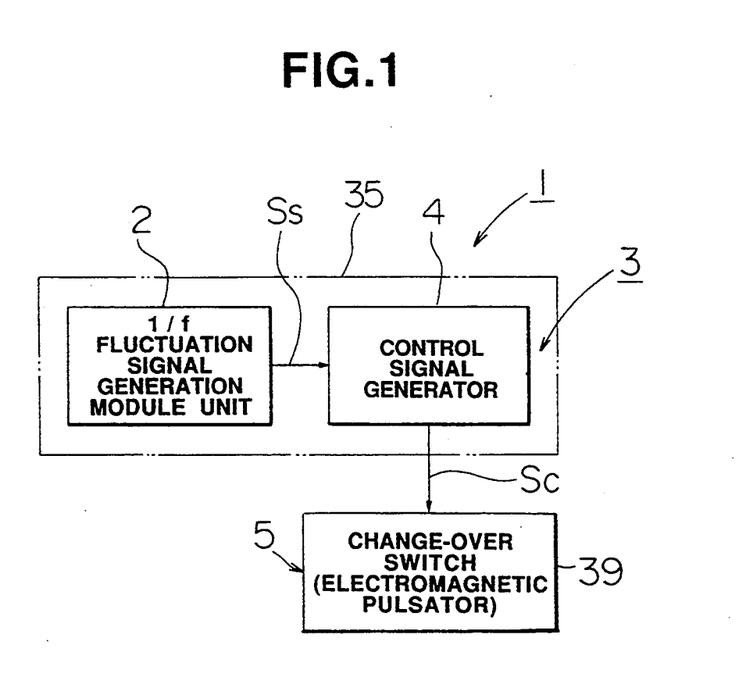
FIG. 1 is a block diagram showing a portion of a milking machine of a preferred embodiment according to the present invention.
Figure 2:
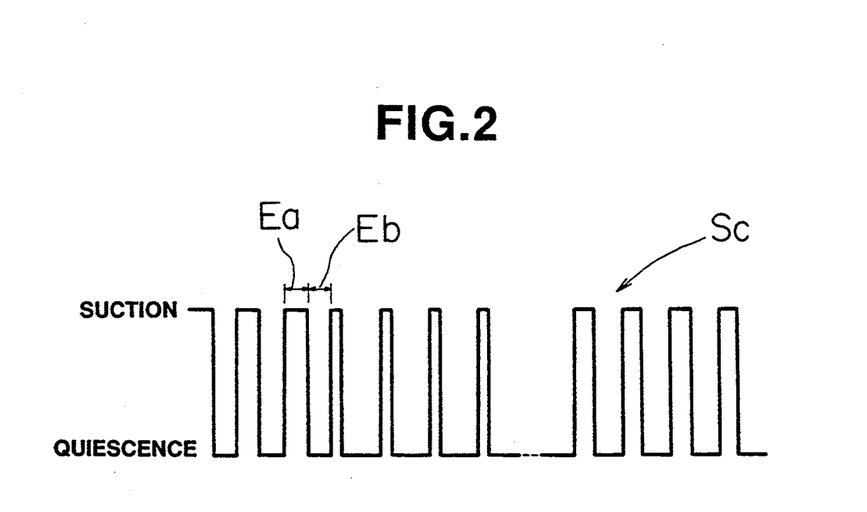
FIG. 2 is a signal wave form chart showing a pulse control signal of the milking machine of FIG. 1.

Next, the milking machine 1 will be explained with reference to FIG. 1.

Element 35 is a controller including a 1/f fluctuation signal generation module unit 2 and a control signal generator 4. The controller 35 controls the electromagnetic pulsator 39 (the change-over switch 5). The control signal generator 4 and the electromagnetic pulsator 39 constitute control unit 3.

The 1/f fluctuation signal generation module unit 2 generates the 1/f fluctuation signal Ss, and is connected to of the control signal generator 4. The control signal generator 4 includes a pulse transmitter which generates the pulse control signal Sc from the transmitted pulse signal and the 1/f fluctuation signal Ss, and outputs the pulse control signal Sc to the electromagnetic pulsator 39.

Next, the operation and the function of the milking machine 1 will be explained referring to FIGS. 1 to 6.

Figure 5:
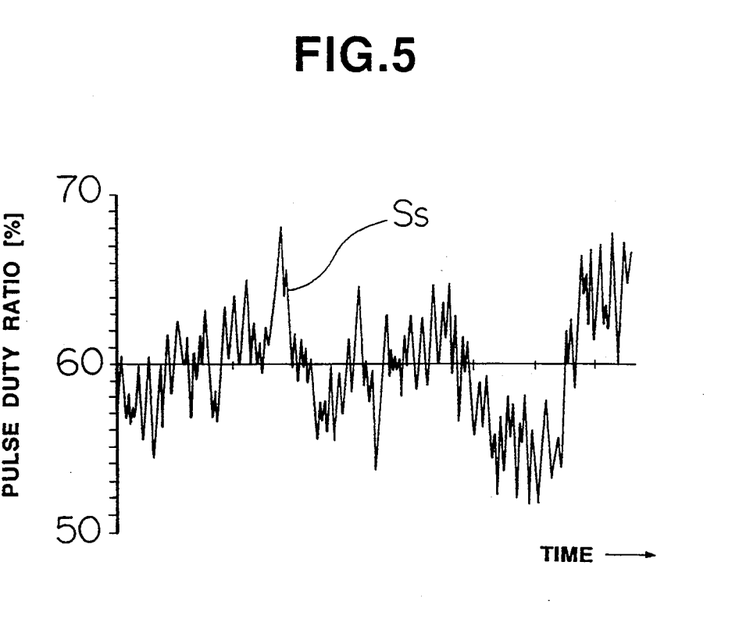
FIG. 5 is a signal wave form chart showing a 1/f fluctuation signal of the milking machine of FIG. 1.

Each teat cup liner R is fastened to a teat B (see FIG. 4). The 1/f fluctuation signal generation module unit 2 generates the 1/f fluctuation signal Ss. In this case, the 1/f fluctuation signal Ss, shown in FIG. 5, is obtained by combining one, two or more 1/f fluctuation patterns obtained from the biorhythm of a cow, i.e., the change with the passage of time in measured inside pressure of a mouth of a calf (see FIG. 17).

The 1/f fluctuation signal Ss is applied to the control signal generator 4. Thus, the pulse transmitter in the control signal generator 4 transmits the pulse signal. The duty ratio of the pulse signal is gradually changed (modulated) by the 1/f fluctuation signal Ss, thereby generating the pulse control signal Sc shown in FIG. 2. In this case, the duty ratio (the suction period / the whole period) is desirable to be changed within the range of approx. 40 to 70% as shown in FIG. 5. As a result, the ratio (the pulsation ratio) between the suction period Ea and the quiescense period Eb of the pulse control signal Sc is changed corresponding to the 1/f fluctuation signal Ss (see FIG. 2). The duty ratio can be set exceeding said range; however, a large excess may increase cow stress. The number of pulsations per minute (pulsations per minute) is set to around 60. The value can be fixed or changed according to the 1/f fluctuation signal Ss as described below.

The pulse control signal Sc is applied to the electromagnetic pulsator 39. Therefore, during the suction period Ea of the pulse control signal Sc, the change-over valve 39v of the electromagnetic pulsator 39 is switched to one side, then the vacuum tube 38 is in a "suction" state in which passage is available, thereby permitting milking. In other words, vacuum pressure of the vacuum pipe 32 acts on the internal cavity 37 as negative pressure, and the teat cup liner R changes from a contraction state to an expansion state as a full line shown in FIG. 4. During the quiescence period Eb of the pulse control signal Sc, the change-over valve 39v of the electromagnetic pulsator 39 is switched as shown in FIG. 4 with a phantom line, and the internal cavity 37 is opened to air and becomes the state of "quiescence". In this case, the teat cup liner R returns to the state of contraction as shown in phantom line in FIG. 4.

Figure 6:
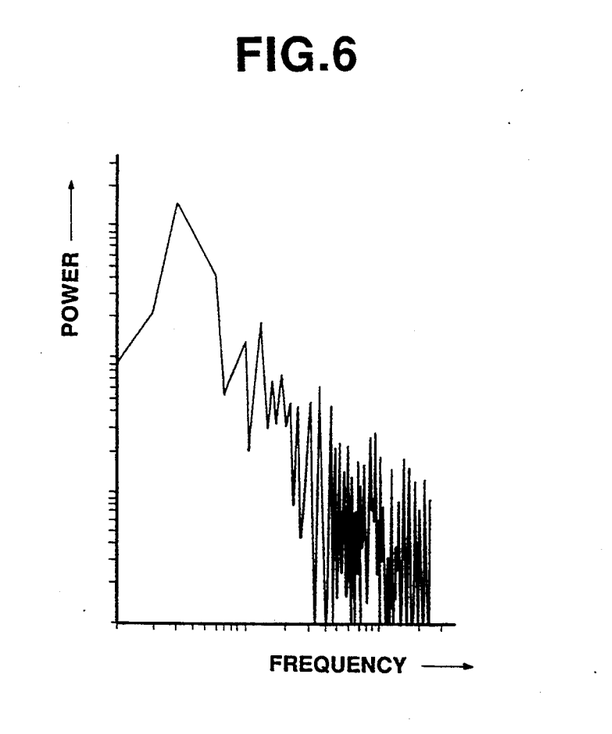
FIG. 6 is a power spectrum characteristic chart of the 1/f fluctuation signal shown in FIG. 5.

Therefore, the periods of the "suction" state and the "quiescence" state are changed based on 1/f fluctuation. The power spectrum characteristics against the 1/f fluctuation signal Ss shown in FIG. 5 become 1/f fluctuation as shown in FIG. 6, and the condition which is approximate to the change with the passage of time in inside pressure of a mouth of a calf during sucking can be obtained.

Figure 7:
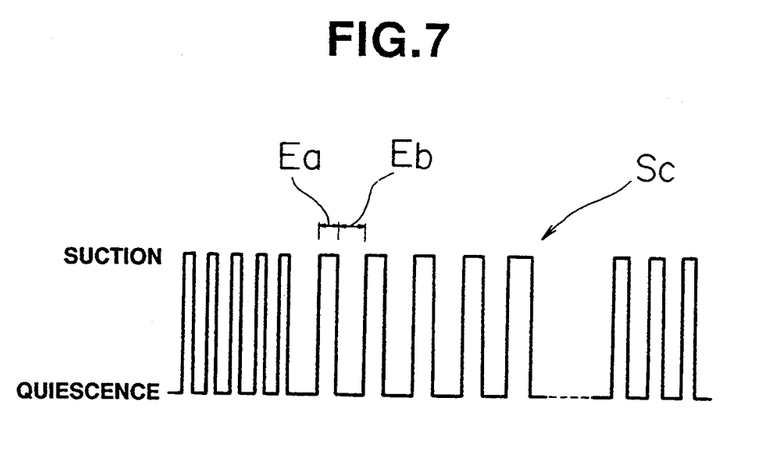
FIG. 7 is a signal wave form chart showing another example of the pulse control signal of the milking machine of FIG. 1.
Figure 8:
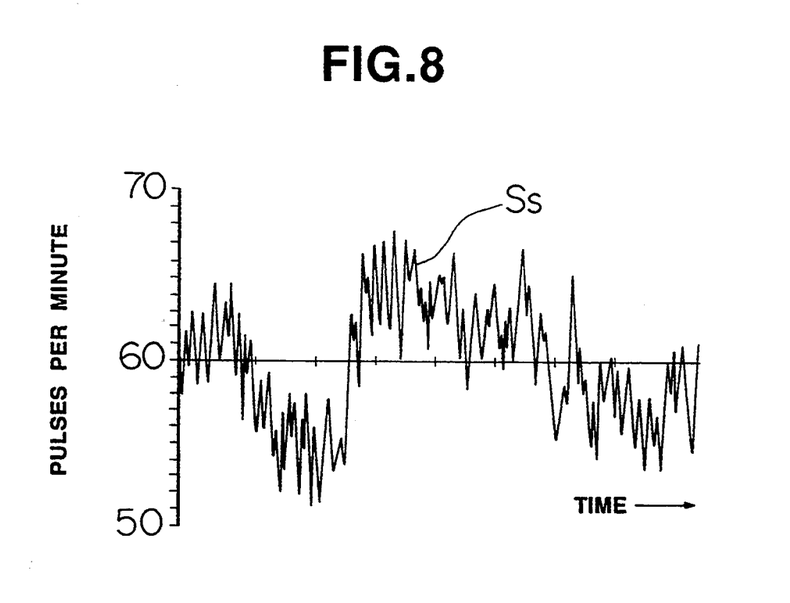
FIG. 8 is a power spectrum characteristic chart of the 1/f fluctuation signal shown in FIG. 7.

In the above preferred embodiment, the generated 1/f fluctuation signal Ss is obtained using the time change in measured inside pressure of a calf is mouth, however, the 1/f fluctuation signal Ss can be generated by combining one, two or more 1/f fluctuation patterns of heart beats obtained from the measured electrocardiogram of a cow (see FIG. 19). In this case, for the pulse signal transmitted from the pulse transmitter in the control signal generator 4, as shown in FIG. 7, pulses per unit time can be gradually changed by the 1/f fluctuation signal Ss. It is desirable that the pulses are changed within the range of approx. 40 to 70 per minute as shown in FIG. 8. Such a method in which pulses per unit time are changed can be combined with the above mentioned method in which the duty ratio is changed, or each method can be adopted selectively. Further, as another method for generating the 1/f fluctuation signal Ss as shown in FIG. 5 or FIG. 8, there may be a method of storing random numbers to be 1/f fluctuation in ROM (Read Only Memory).

Next, the milking machine 1x of another preferred embodiment of the present invention will be described with reference to FIGS. 9 to 13.

Figure 9:
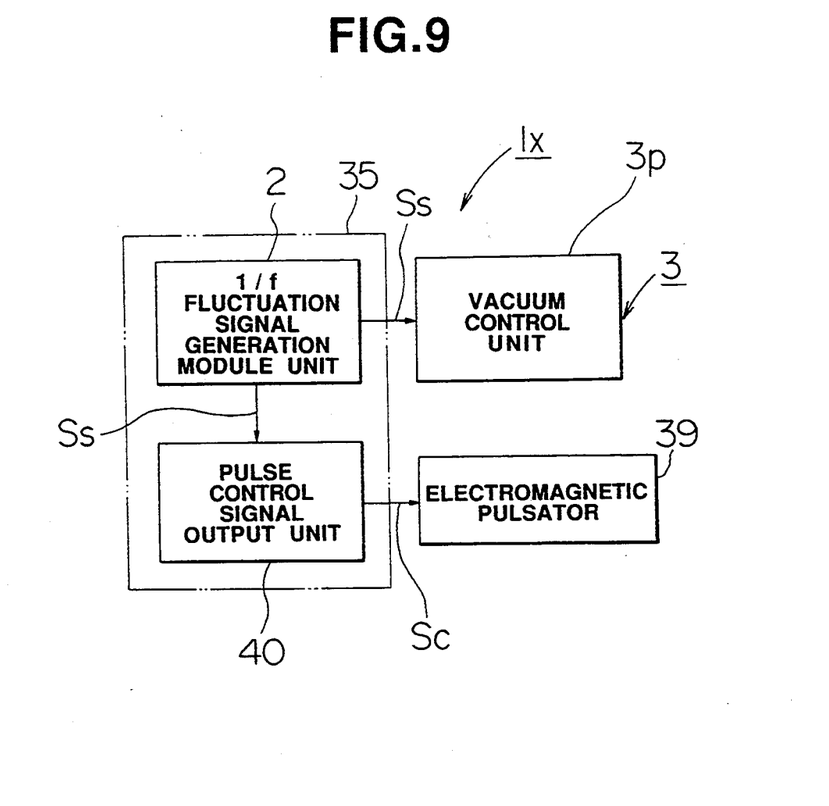
FIG. 9 is a block diagram of a portion of a milking machine of another preferred embodiment of the present invention.
Figure 11:
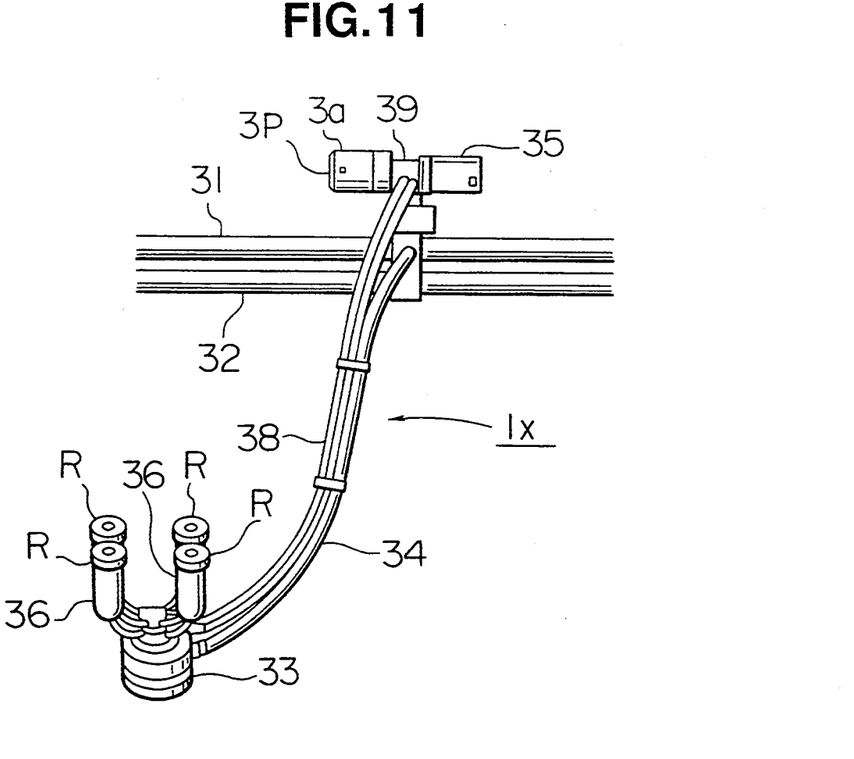
FIG. 11 is a perspective view showing a whole configuration of the milking machine of FIG. 9.
Figure 12:
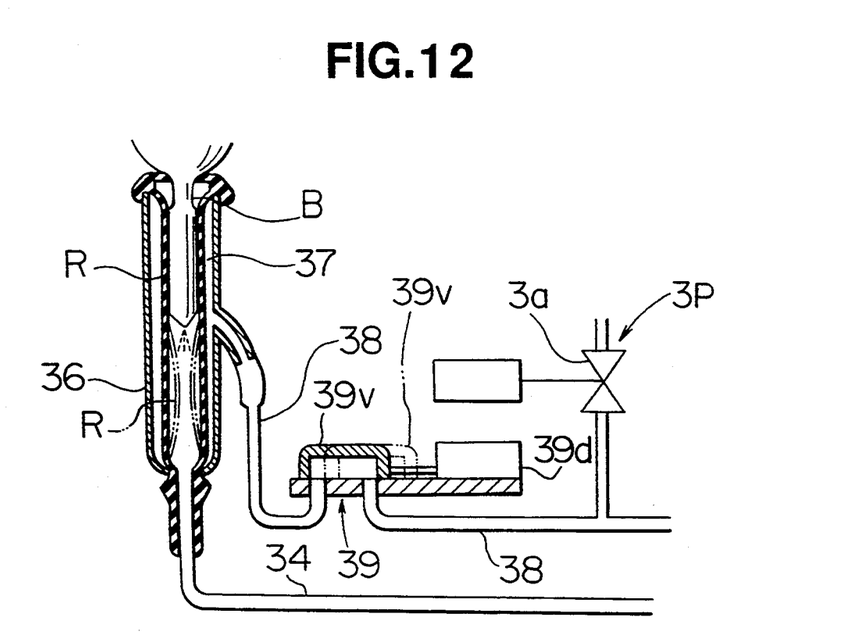
FIG. 12 is an explanative figure of a function of the milking machine of FIG. 9 including a sectional view of a teat cup liner.

The milking machine 1x is different from the above preferred embodiment in that the magnitude of negative pressure is changed by the 1/f fluctuation signal Ss. Accordingly, as shown in FIG. 11 and FIG. 12, in the milking machine 1x, the inner cavity 37 of the teat cup shell 36 is connected to the vacuum pipe 32 through the vacuum tube 38, the electromagnetic pulsator 39, and a vacuum control unit 3P. In this case, for the vacuum control unit 3P, an electromagnetic proportional throttle valve 3a in which the aperture is changed correspondingly to the magnitude of the input signal can be utilized as shown in FIG. 12. When the aperture of the electromagnetic proportional throttle valve 3a is increased, the degree of opening of the vacuum tube 38 to air is increased and the negative pressure is decreased, and when the aperture is decreased, the degree of opening of the vacuum tube 38 to air is decreased and the negative pressure is increased. As shown in FIG. 9, the fluctuation signal generation module unit 2 and the electromagnetic pulsator 39 are connected by a pulse control signal output unit 40. In addition, the vacuum control unit 3P (the control unit 3) is also connected to the fluctuation signal generation module unit 2.

Figure 13:
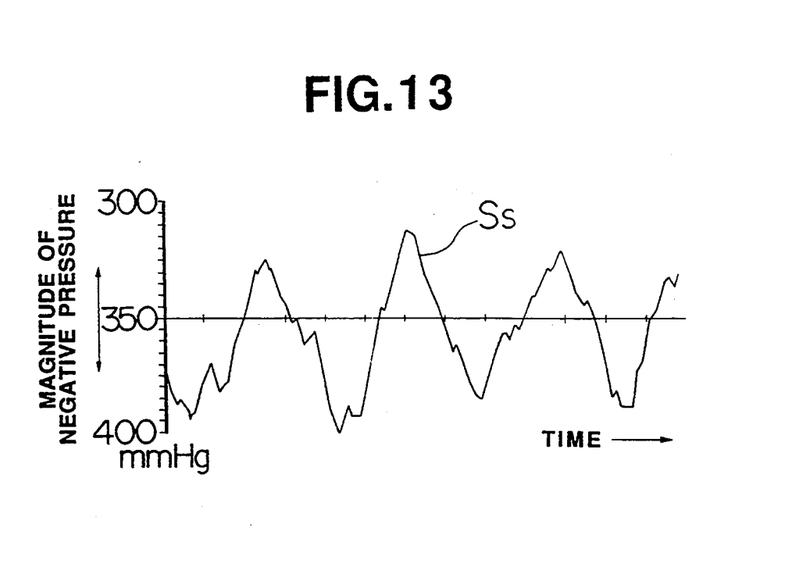
FIG. 13 is a signal wave form chart showing a 1/f fluctuation signal of the milking machine of FIG. 9.

Accordingly, the operation and the function of the milking machine 1x is as follows. First, the 1/f fluctuation signal generation module unit 2 generates the 1/f fluctuation signal Ss shown in FIG. 13. In this case, the 1/f fluctuation signal Ss can be generated similarly to the signal in the above preferred embodiment, however, for the aperture control of the electromagnetic proportional throttle valve, the degree of change with the passage of time is set more coarsely. The 1/f fluctuation signal Ss is applied to the vacuum control unit 3P, then the aperture of the electromagnetic proportional throttle valve 3a of the vacuum control unit 3P is changed corresponding to the magnitude of the 1/f fluctuation signal Ss, thereby changing the magnitude of the negative pressure for suction. In this case, as shown in FIG. 13, it is desirable that the magnitude of the negative pressure is changed within the range of approx. 300 to 400 mmHg. On the other hand, the pulse transmitter in the pulse control signal output unit 40 outputs the pulse control signal Sc shown in FIG. 10, and the pulse control signal Sc is applied to the electromagnetic pulsator 39. In this case, pulses of the pulse control signal Sc can be fixed to around 60 per minute, and the duty ratio can be fixed to around 60%, or like the above preferred embodiment, pulses can be changed within the range of 40 to 70 per minute, and the duty ratio can be changed within the range of 40 to 70%. Further, pulses per unit time, the duty ratio, and the magnitude of the negative pressure can be changed simultaneously or can be changed individually selecting one, two or more.

Figure 10:
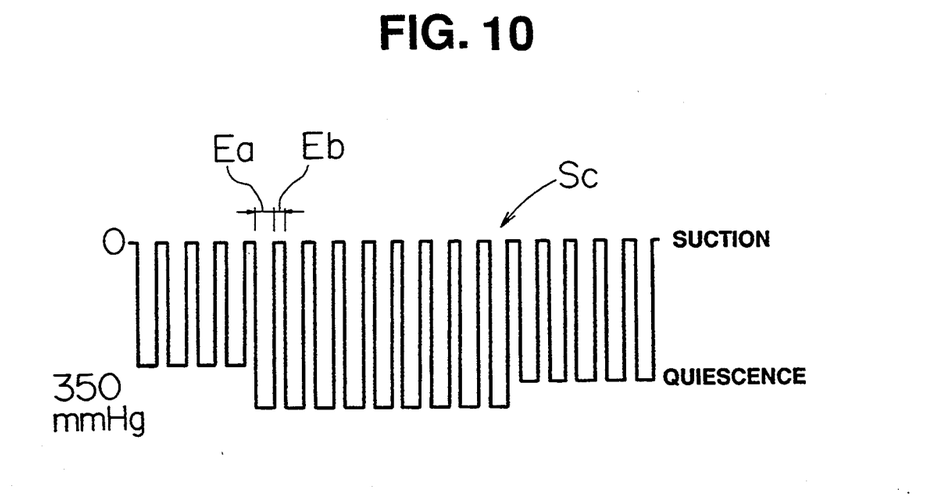
FIG. 10 is a signal wave form chart showing a pulse control signal showing the milking machine of FIG. 9.

Therefore, during the suction period Ea of the pulse control signal Sc shown in FIG. 10, the change-over valve 39v of the electromagnetic pulsator 39 is switched and the vacuum tube 38 is in a state of "suction" in which passage is available. On the other hand, during the quiescence period Eb, the change-over valve 39v of the electromagnetic pulsator 39 is switched, and the inner cavity 37 is opened to air in a "quiescence" state, and the magnitude of the negative pressure is changed with the passage of time.

In FIGS. 9 to 13, the same reference symbols are to the same structural parts 25 in FIGS. 1 to 5 and description of these elements will not be repeated.

Next, the milking machine 1y of the yet another preferred embodiment of the present invention will be explained referring to FIG. 14 and FIG. 15.

In the milking machine 1y, in addition to the mechanism in which pulses per unit time of the pulse control signal Sc and the duty ratio or the magnitude of the negative pressure of the pulse control signal Sc are changed using the 1/f fluctuation signal Ss, 1/f fluctuation music is utilized during milking.

First, the milking machine 1y will be generally described. In the milking machine 1y shown in FIG. 14 and FIG. 15, element 50 is a 1/f fluctuation music generation unit having a 1/f fluctuation music generator 51 for generating or reproducing a 1/f fluctuation music signal Sm, an amplifier 52 for amplifying the 1/f fluctuation music signal Sm, and a loudspeaker 53 for converting the amplified 1/f fluctuation music signal Sm into sound. In this case, the 1/f fluctuation music signal Sm has power spectrum characteristics as shown in FIG. 16. Further, element 35 is a controller including the 1/f fluctuation signal generation module unit 2 for generating the 1/f fluctuation signal Ss and the pulse control signal output unit 40 with the pulse transmitter. To the fluctuation signal generation module unit 2, the vacuum control unit 3P (the electromagnetic proportional throttle valve) is connected. To the pulse control signal output unit 40, the electromagnetic pulsator 39 is connected. The pulse control signal output unit 40, the electromagnetic pulsator 39, and the vacuum control unit 3P constitute the control unit 3.

Accordingly, the operation and the function of the milking machine 1y are as follows. First, during the milking, the 1/f fluctuation music generator 51 generates or reproduces the 1/f fluctuation music signal Sm. In this case, the 1/f fluctuation music generator 51 can be, for example, a player for reproducing music sources storing 1/f fluctuation music, or one having a function of composing and generating 1/f fluctuation music by itself using the 1/f fluctuation signal Sc obtained from the 1/f fluctuation signal generation module unit 2 which will be described below. The generated 1/f fluctuation music signal Sm is amplified by the amplifier 52, and then sent to the loudspeaker 53 to be output as sound. Accordingly, a cow is milked listening to the 1/f fluctuation music, thus improving the milking efficiency by stimulating hormone secretion. Further, from the 1/f fluctuation signal generation module unit 2, the 1/f fluctuation signal Ss is generated as in the above preferred embodiment, and the generated 1/f fluctuation signal Ss is applied to the vacuum control unit 3P and the pulse control signal output unit 40 respectively. Accordingly, like the above preferred embodiment, the magnitude of the negative pressure is changed, and the pulse control signal Sc whose pulses per unit time or the duty ratio are changed corresponding to the magnitude of the 1/f fluctuation signal Ss is obtained from the pulse control signal output unit 40 to be applied to the electromagnetic pulsator 39. In this case, pulses per unit time, the duty ratio, and the magnitude of the negative pressure can be changed simultaneously, or can be changed individually selecting one, two or more.

Figure 14:
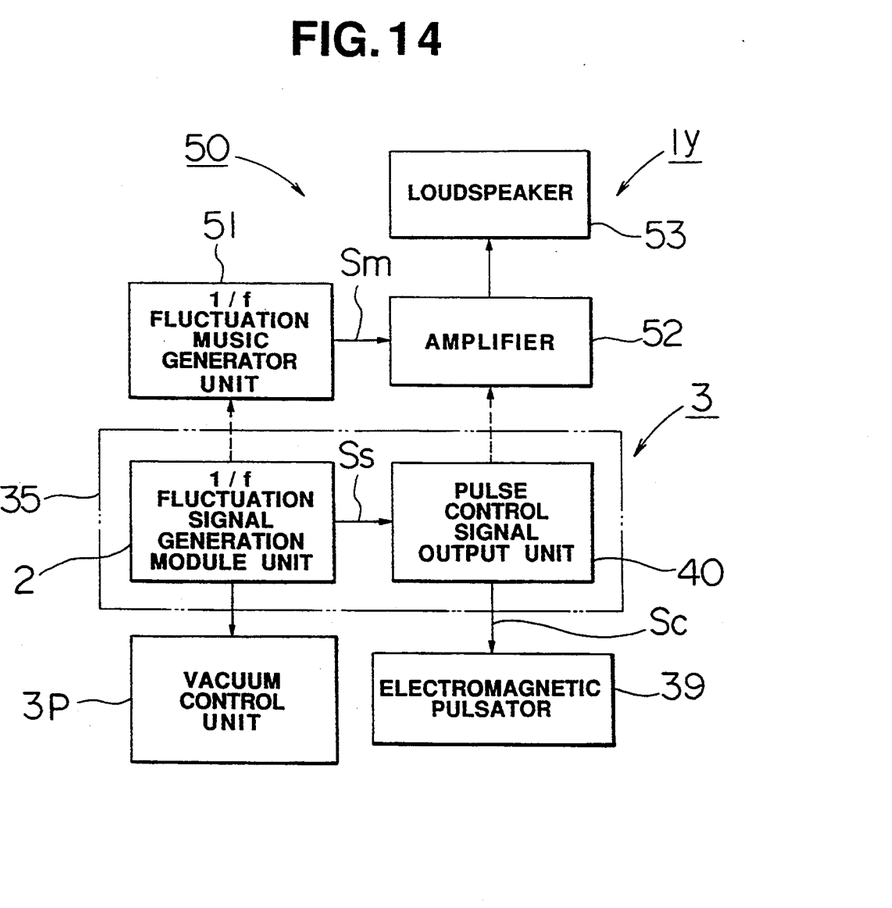
FIG. 14 is a block diagram of a portion of a milking machine of yet another preferred embodiment of the present invention.
Figure 15:
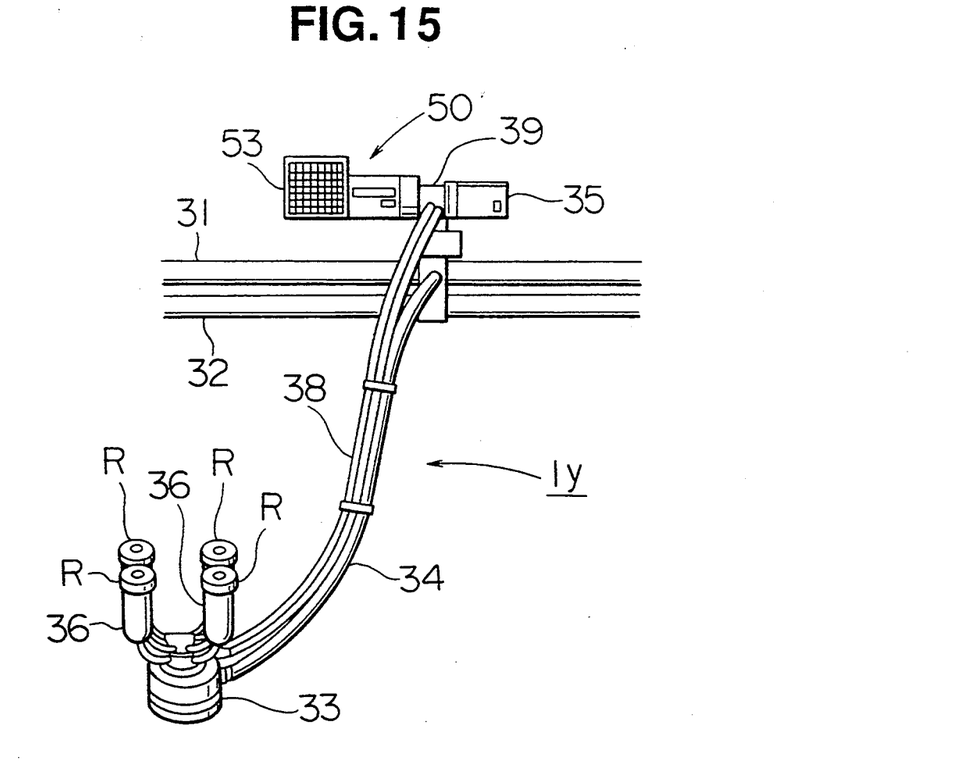
FIG. 15 is a perspective view showing a whole configuration of the milking machine of FIG. 14.
Figure 16:
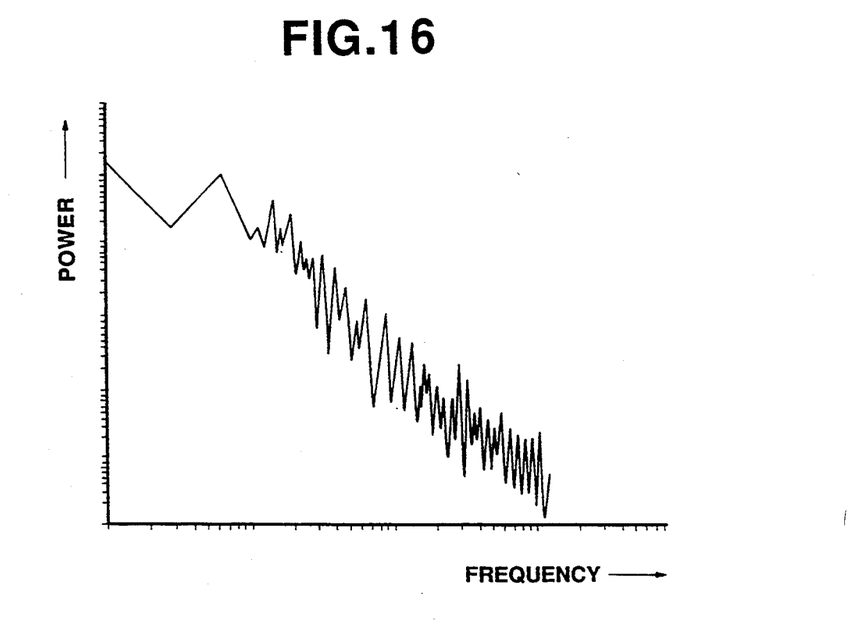
FIG. 16 is a power spectrum characteristic chart of a 1/f fluctuation music signal.

In FIG. 14 and FIG. 15, the same reference symbols refer to the same structural parts in FIG. 9 and FIG. 11 and description of these elements will not be repeated.

The present invention is not limited to the embodiments described above. Configuration of small parts, arrangement and numerical values may be changed arbitrarily without departing from the spirit of the present invention.

We claim:

1. In a milking machine for milking a cow wherein teat cup liners are fastened to teats of the cow and a negative pressure is applied thereto, said milking machine comprising:
   a fluctuation signal generation module unit for generating a fluctuation signal, from a time series signal representing a heart beat of a calf; and
   a control unit for controlling a magnitude of the negative pressure applied to the teats of the cow during milking corresponding to the fluctuation signal.

2. The milking machine of claim 1, wherein said control unit includes
   a control signal generator for generating a pulse control signal which varies in accordance with the fluctuation signal; and
   a change-over switch for switching said milking machine from a suction state to a quiescence state or vice versa based on said pulse control signal.

3. The milking machine of claim 2, wherein said control signal generator generates the pulse control signal such that a duty ratio of the pulse control signal varies corresponding to the fluctuation signal.

4. The milking machine of claim 3, wherein the duty ratio is 40 to 70%.

5. The milking machine of claim 2, wherein said control signal generator generates the pulse control signal such that a number of pulses per unit time corresponding to the fluctuation signal.

6. The milking machine of claim 5, wherein the number of pulses per unit time is 40 to 70 per minute.

7. The milking machine of claim 1, wherein the magnitude of the negative pressure is 300 to 400 mmHg.

8. A milking machine, comprising:
   fluctuation signal generating means for generating a fluctuation signal, from a time series signal representing a heart beat of a calf; and
   control means for controlling a suction state and a quiescence state of said milking machine based on the fluctuation signal.

9. The milking machine of claim 8, said control means including,
   pulse transmitting means for generating a pulse signal and modulating the pulse signal by the fluctuation signal to produce a pulse control signal, and
   pulsation means for receiving the pulse control signal and controlling the suction state and quiescence state of said milking machine in accordance with a duty cycle of the pulse control signal.

* * * * *